UNITED STATES PATENT OFFICE.

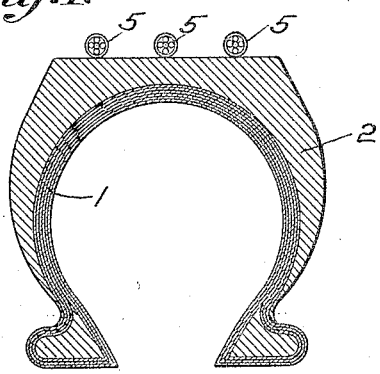
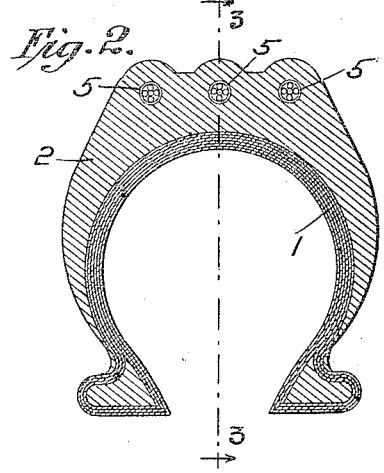
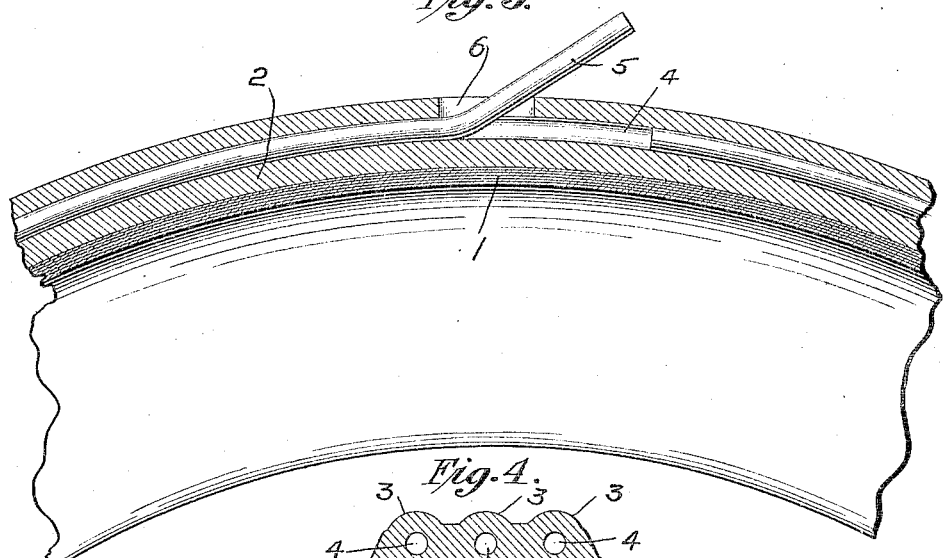
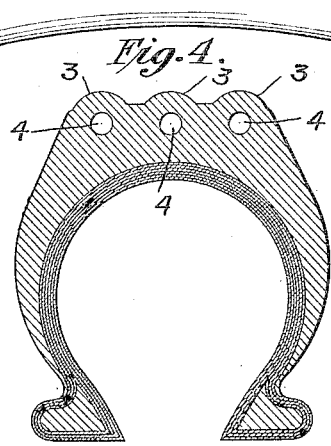
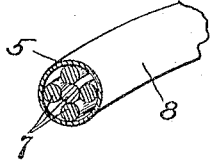

GEORGE H. CHINNOCK, OF NEW YORK, N. Y.

CORE FOR MAKING VEHICLE-TIRES.

1,319,644.     Specification of Letters Patent.     Patented Oct. 21, 1919.

Application filed August 22, 1917, Serial No. 187,536. Renewed April 14, 1919. Serial No. 290,079.

*To all whom it may concern:*

Be it known that I, GEORGE H. CHINNOCK, a citizen of the United States of America, and resident of Woodhaven, county of Queens, city and State of New York, have invented a certain new and useful Core for Making Vehicle-Tires, of which the following is a specification.

My invention relates to cores for use in making vehicles tires, particularly the tire of my United States Letters Patent No. 1,131,772, dated March 16, 1915. The tire of the said patent is characterized by a plurality of hollow peripheral elastic ribs in its tread surface.

It has been found desirable, in making the said tire, to form the cushion bores in the rubber of the tread, instead of embedding, in the tread, tubes having those cushion bores formed therein. Extreme difficulty has been experienced, however, in locating, within the tread rubber, cores, or other means for forming such cushion bores, in such manner that the said cores may be removed after vulcanization of the rubber. By my present invention this difficulty is overcome.

My invention consists in improved cores whereby cushion bores may be formed in the tread of a tire by means of cores, and the cores removed after the completion of vulcanization.

The object of my invention is, to facilitate the manufacture of vehicle tires and the like, which are provided with cushion bores in their tread surface.

I will now proceed to described my invention with reference to the accompaying drawings, in which various steps in the formation of a tire or tire shoe, according to my invention, are illustrated, and will then point out the novel features and claims.

In the said drawings:

Figure 1 shows a transverse section of my tire shoe with removable cores laid on the partly formed shoe; Fig. 2 is a similar section of the tire shoe after vulcanization; Fig. 3 shows a fragmentary axial section of the tire on the line 3—3 of Fig. 2 and illustrates the method of withdrawal of one of the cores; Fig. 4 shows a transverse section of the completed tire; and Fig. 5 shows a fragmentary perspective elevation and partial section of one form of core which may be used in the forming of the tire.

Referring now to the drawings; numeral 1 designates the usual carcass of a shoe and numeral 2 the rubber applied outside of such carcass. In Fig. 4, 3—3 designate ribs on the tread surface of the tire and 4—4 designate corresponding cushion bores or holes extending peripherally around the tire. These cushion bores 4—4 provide the space necessary in order that the rubber of the tread itself may yield locally as a cushion body and independent of yielding of the shoe as a whole. By reason of this local yielding capacity of the tread, the shoe is relatively soft and easy riding, even though the tire be inflated at unusually high pressure, as is desirable for durability of the tire. The said relatively yieldable ribs also give a very effective grip on the road surface and are extremely efficient in preventing skidding.

Fig. 1 shows a preliminary stage in the formation of the shoe preparatory to vulcanization. The side rubber and a portion of the tread rubber has been applied to the carcass, and then a suitable number of cores 5 have been laid upon the periphery of the rubber so applied, in the positions which the cushion bores are to occupy subsequently. The core used preferably comprises a group of wires, surrounded by a rubber-impervious material 8. This rubber-impervious material may be Holland, the material of which window shades are commonly made, but various other fabrics and flexible materials are equally suited for the purpose. After the cores have been so laid, more rubber is laid to form the tread and to embed and locate these cores 5. The shoe as thus far completed is then placed in a vulcanizing mold and vulcanized in the ordinary manner, the resulting product being shown in Fig. 2. After vulcanization the cores 5 must be removed. To this end, a small slit 6 is cut opposite the abutted ends of each of the cores, and by reaching down with a suitable tool, one end of each core is grasped and drawn out, and in this manner the entire core is drawn out. It is a simple matter in the application of the rubber over the cores to mark the points where the abuttting ends of each core are located; and hence it is easy to slit the tread surface at the proper point to form the aperture for drawing out the core.

After the cores have been drawn out in the manner described, the slits may be closed by cement or otherwise, and the shoe is then complete, in so far as its construction is concerned.

Of course, the core may be covered with graphite or other material suitable to facilitate the withdrawal of the core from the rubber.

What I claim is:

1. A core for forming a hollow space in the material of a pneumatic tire shoe or the like, comprising a group of wires surrounded by a layer of rubber-impervious flexible material.

2. A core for forming a hollow space in the material of a pneumatic tire shoe or the like, comprising a group of wires surrounded by a layer of rubber-impervious flexible fabric.

In testimony whereof I have signed this specification in the presence of two subscribing witnesses.

GEORGE H. CHINNOCK.

Witnesses:
 JOHN M. BOTELER,
 H. M. MARBLE.

Copies of this patent may be obtained for five cents each, by addressing the "Commissioner of Patents, Washington, D. C."